United States Patent
Johns et al.

(10) Patent No.: US 11,549,836 B2
(45) Date of Patent: Jan. 10, 2023

(54) LIQUID NMR SIGNAL BOOST DURING NMR FLOW METERING OF WET GAS FLOW USING ENHANCED SIGNAL RELAXATION AND/OR DYNAMIC NUCLEAR POLARISATION USING IMMOBILISED RADICALS

(71) Applicants: SAUDI ARABIAN OIL COMPANY, Dhahran (SA); UNIVERSITY OF WESTERN AUSTRALIA, Crawley (AU)

(72) Inventors: Michael Leslie Johns, Canning Vale (AU); Masoumeh Zargar, Carramar (AU); Einar Orn Fridjonsson, Lesmurdie (AU); Paul Stanwix, Darlington (AU); Jana M. Al-Jindan, Dammam (SA); Mohamed Nabil Noui-Mehidi, Dhahran (SA)

(73) Assignees: SAUDI ARABIAN OIL COMPANY, Dhahran (SA); UNIVERSITY OF WESTERN AUSTRALIA, Crawley (AU)

( * ) Notice: Subject to any disclaimer, the term of this patent is extended or adjusted under 35 U.S.C. 154(b) by 0 days.

(21) Appl. No.: 17/330,783

(22) Filed: May 26, 2021

(65) Prior Publication Data
US 2022/0381597 A1 Dec. 1, 2022

(51) Int. Cl.
*G01F 1/716* (2006.01)
(52) U.S. Cl.
CPC .................... *G01F 1/716* (2013.01)
(58) Field of Classification Search
CPC .............. G01F 1/716; G01R 33/563; G01R 33/56308; G01R 33/56316; G01R 33/56509
See application file for complete search history.

(56) References Cited

U.S. PATENT DOCUMENTS 4,583,996 A * 4/1986 Sakata ................... B01D 71/04
95/52
6,046,587 A 4/2000 King et al.
(Continued)

FOREIGN PATENT DOCUMENTS

CN 110082382 A 8/2019

OTHER PUBLICATIONS

Fridjonsson, Einar O. et al., "Earth's field NMR flow meter: Preliminary quantitative measurements"; Journal of Magnetic Resonance; vol. 245; pp. 110-115; Aug. 2014 (6 pages).
(Continued)

*Primary Examiner* — Jermele M Hollington
*Assistant Examiner* — Suresh K Rajaputra
(74) *Attorney, Agent, or Firm* — Osha Bergman Watanabe & Burton LLP (57) ABSTRACT

A multiphase flow metering device may have a conduit through which a multiphase fluid can flow and a structured packing insert positioned in the conduit. The structured packing insert may have a water-wet packing structure zone and/or an oil-wet packing structure zone. The multiphase flow metering device may also have a Halbach pre-polarizing magnet array positioned around the conduit, an RF coil, an electromagnet, an NMR console adapted to detect NMR signals from the multiphase fluid, and a control system configured to vary a polarization of the Halbach pre-polarizing magnet array. The Halbach pre-polarizing magnet array may be positioned or positionable over one or both of the oil-wet and water-wet packing structure zones. In some embodiments, the structured packing insert may include immobilized radicals, providing for dynamic nuclear polarization of the multiphase fluid.

20 Claims, 4 Drawing Sheets

(56) References Cited

U.S. PATENT DOCUMENTS

| | | |
|---|---|---|
| 10,151,817 B2 | 12/2018 | Hogendoorn et al. |
| 2008/0174309 A1 | 7/2008 | Pusiol et al. |
| 2012/0092006 A1 | 4/2012 | Li et al. |
| 2014/0028310 A1 | 1/2014 | Zoeteweij et al. |
| 2015/0008917 A1* | 1/2015 | Kentgens ............... G01R 33/62 324/307 |
| 2016/0076924 A1* | 3/2016 | Pusiol ................. G01R 33/445 324/306 |
| 2016/0313267 A1* | 10/2016 | Kwak ..................... G01V 3/32 |

OTHER PUBLICATIONS

Oliemans, R. V. A. et al., "Core-Annular Oil/Water Flow: The Turbulent-Lubricating-Film Model and Measurements in a 5 cm Pipe Loop"; International Journal of Multiphase Flow; vol. 13, No. 1; pp. 23-31; Jan.-Feb. 1987 (9 pages).

O'Neill, Keelan T. et al., "Quantitative velocity distributions via nuclear magnetic resonance flow metering"; Journal of Magnetic Resonance; vol. 269; pp. 179-185; Aug. 2016 (7 pages).

O'Neill, Keelan T. et al., "Quantitative multiphase flow characterisation using an Earth's field NMR flow meter"; Flow Measurement and Instrumentation; vol. 58; pp. 104-111; Dec. 2017 (8 pages).

O'Neill, Keelan T. et al., "Two-phase oil/water flow measurement using an Earth's field nuclear magnetic resonance flow meter"; Chemical Engineering Science; vol. 202; pp. 222-237; Jul. 20, 2019 (16 pages).

Pendlebury, J. M. et al., "Precision field averaging NMR magnetometer for low and high fields, using flowing water"; Review of Scientific Instruments; vol. 50, No. 5; pp. 535-540; May 1979 (6 pages).

Sukstanskii, Alexander L. et al., "Theory of FID NMR Signal Dephasing Induced by Mesoscopic Magnetic Field Inhomogeneities in Biological Systems"; Journal of Magnetic Resonance; vol. 151, Issue 1; pp. 107-117; Jul. 2001 (11 pages).

Trallero, J. L. et al., "A Study of Oil/Water Flow Patterns in Horizontal Pipes"; SPE Production & Facilities; vol. 12, Issue 3; pp. 165-172; Aug. 1997 (8 pages).

Xu, Jing-yu et al., "Experimental investigation on the slip between oil and water in horizontal pipes"; Experimental Thermal and Fluid Science; vol. 33, Issue 1; pp. 178-183; Oct. 2008 (6 pages).

Zhen, J. Z. et al., "A resistive Q-switch for low-field NMR systems"; Journal of Magnetic Resonance; vol. 287; pp. 33-40; Feb. 2018 (8 pages).

Hirasaki, George J. et al., "Fluid-Rock Characterization and Interactions in NMR Well Logging"; U.S. Department of Energy, Office of Scientific and Technical Information; pp. 1-173; Sep. 5, 2002 (197 pages).

Appel, M. et al., "Robust Multi-Phase Flow Measurement Using Magnetic Resonance Technology"; Proceedings of the SPE Middle East Oil and Gas Show and Conference; pp. 1-20; Sep. 25-28, 2011 (20 pages).

International Search Report Issued in Corresponding Application No. PCT/US2022/030914, dated Sep. 13, 2022, 5 pages.

Written Opinion Issued in Corresponding Application No. PCT/US2022/030914, dated Sep. 13, 2022, 7 pages.

* cited by examiner

LIQUID NMR SIGNAL BOOST DURING NMR FLOW METERING OF WET GAS FLOW USING ENHANCED SIGNAL RELAXATION AND/OR DYNAMIC NUCLEAR POLARISATION USING IMMOBILISED RADICALS

BACKGROUND

Current multiphase metering methods have limitations with regards to the high accuracy and repeatability of the measurements. For example, many industrial fluid streams, such as those encountered in oil drilling operations, are highly complex due to the wide range of possible flow regimes. The signals produced by some multiphase metering methods are dependent upon flow regime, which may ultimately lead to unreliable data for complex systems. In the case of multiphase flow metering based on the principles of Nuclear Magnetic Resonance (NMR), an additional challenge occurs in measurement applications for wet gases, such as those having a minority liquid phase. In this case, the NMR signal from the liquid phases will be swamped by the signal from the much more dominant gas phase. Furthermore, and more broadly relevant, the existing NMR phase quantification relies on a reasonably different $T_1$ (or other NMR signal relaxation parameter) value for the oil and water content. This is not always the case, in particular for light oils and condensates.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a multiphase flow metering device having a conduit through which a multiphase fluid can flow and a structured packing insert positioned in the conduit. The structured packing insert may have a water-wet packing structure zone and/or an oil-wet packing structure zone. The multiphase flow metering device may also have a Halbach pre-polarizing magnet array positioned around the conduit, an RF coil, an electromagnet, an NMR console adapted to detect NMR signals from the multiphase fluid, and a control system configured to vary a position of the Halbach pre-polarizing magnet array. The Halbach pre-polarizing magnet array may be positioned or positionable over one or both of the oil-wet and water-wet packing structure zones.

In another aspect, embodiments disclosed herein relate to a multiphase flow metering device having a conduit through which a multiphase fluid can flow, a Halbach pre-polarizing magnet array positioned around the conduit and a structured packing insert positioned in the conduit. The structured packing insert may have a water-wet packing structure zone and/or an oil-wet packing structure zone, and a surface having immobilized radicals. The multiphase flow metering device may also have a first RF coil positioned around the structured packing insert, a second RF coil, an electromagnet, an NMR console adapted to detect NMR signals from the multiphase fluid, and a control system configured to vary a position of the Halbach pre-polarizing magnet array.

In another aspect, embodiments disclosed herein relate to a method of measuring multiphase flow including flowing a multiphase fluid through a conduit that has a structured packing insert. The structured packing insert may have a water-wet packing structure zone and/or an oil-wet packing structure zone. The method may further include pre-polarizing the multiphase fluid via a Halbach pre-polarizing magnet array positioned around the conduit, polarizing the multiphase fluid via an electromagnet positioned around the conduit and downstream from the structured packing insert, applying a radio frequency to the multiphase fluid via an RF coil, and detecting NMR signals from the multiphase fluid via an NMR console.

In another aspect, embodiments disclosed herein relate to a method of measuring multiphase flow including flow including flowing a multiphase fluid through a conduit that has a structured packing insert. The structured packing insert may have a water-wet packing structure zone and/or an oil-wet packing structure zone, and a surface having immobilized radicals. The method may further include contacting the structured packing insert with the multiphase fluid, pre-polarizing the multiphase fluid via a Halbach pre-polarizing magnet array positioned around the conduit, concomitant with the contacting, generating dynamic nuclear polarization in the multiphase fluid via the immobilized radicals and exciting the multiphase fluid via a radiofrequency of a first RF coil. The first RF coil may be positioned around the structured packing insert, and the radiofrequency may correspond to the energy of the dynamic nuclear polarization. The method may further include polarizing the multiphase fluid via an electromagnet, applying a second radiofrequency via a second RF coil, and detecting NMR signals from the multiphase fluid via an NMR console.

Other aspects and advantages of the claimed subject matter will be apparent from the following description and the appended claims.

DETAILED DESCRIPTION

The ability to accurately monitor the phase and composition of fluid flow is an important aspect of many commercial operations including oil drilling. Non-invasive, real-time detection methods are key for continuous, efficient oil production. Such measurements are challenging to perform for a variety of reasons including the complex composition of produced fluids (e.g., oil, gas, condensate, water). Reliable multiphase flow metering (MPFM) systems are needed.

Nuclear magnetic resonance (NMR) is a useful technique for identifying the composition of fluids. NMR is based upon the observation of nuclei in a magnetic field. Briefly, alignment (i.e., polarization) of nuclear spin is achieved by applying a constant magnetic field. This spin alignment is then perturbed by a weak oscillating field, generally via a radio-frequency (RF) pulse. The resulting NMR signal is typically detected by an RF detection coil. NMR may be used for MPFM, however, challenges exist in distinguishing the individual components of multiphase fluids. The present disclosure is directed to improving NMR signals in order to effectively monitor multiphase fluids, including those encountered in oil and gas drilling operations.

The multiphase fluid in one or more embodiments of the present disclosure may include gas, water and/or oil phases. An oil phase may include any oleaginous fluid such as crude oil, condensates, light hydrocarbon liquids, and many others. The water phase may include any aqueous fluid, such as water, brines, produced water, and many other aqueous fluids used or encountered during drilling and production operations. The gas phase may include natural gas.

NMR apparatuses and associated methods described herein are useful tools for determining the composition and velocity of such multiphase fluids. The NMR signal of a given fluid is determined by, amongst other system and material parameters, the $T_1$ relaxation parameter. As used herein "$T_1$" means the NMR spin-lattice relaxation. Each component of a multiphase fluid has a different $T_1$ value, allowing different components to be distinguished in NMR measurements, in theory. However, it can be difficult to distinguish between different phases in complex multiphase systems. For example, there may be a low relative concentration of liquid phases as compared to a gas phase. Under such circumstances, the gas phase can overwhelm the NMR signal, making detection of liquid phases difficult. The NMR apparatuses disclosed herein are adapted to selectively boost the liquid signal to improve detection and quantification. Similarly, while the components of a multiphase fluid typically have different $T_1$ values, there are some instances in which the $T_1$ values are very difficult to distinguish (e.g., light oils and condensates from water). By selectively enhancing the polarization of one of the phases of a multiphase fluid, phases with similar $T_1$ values can be differentiated and quantified.

Figure 1:
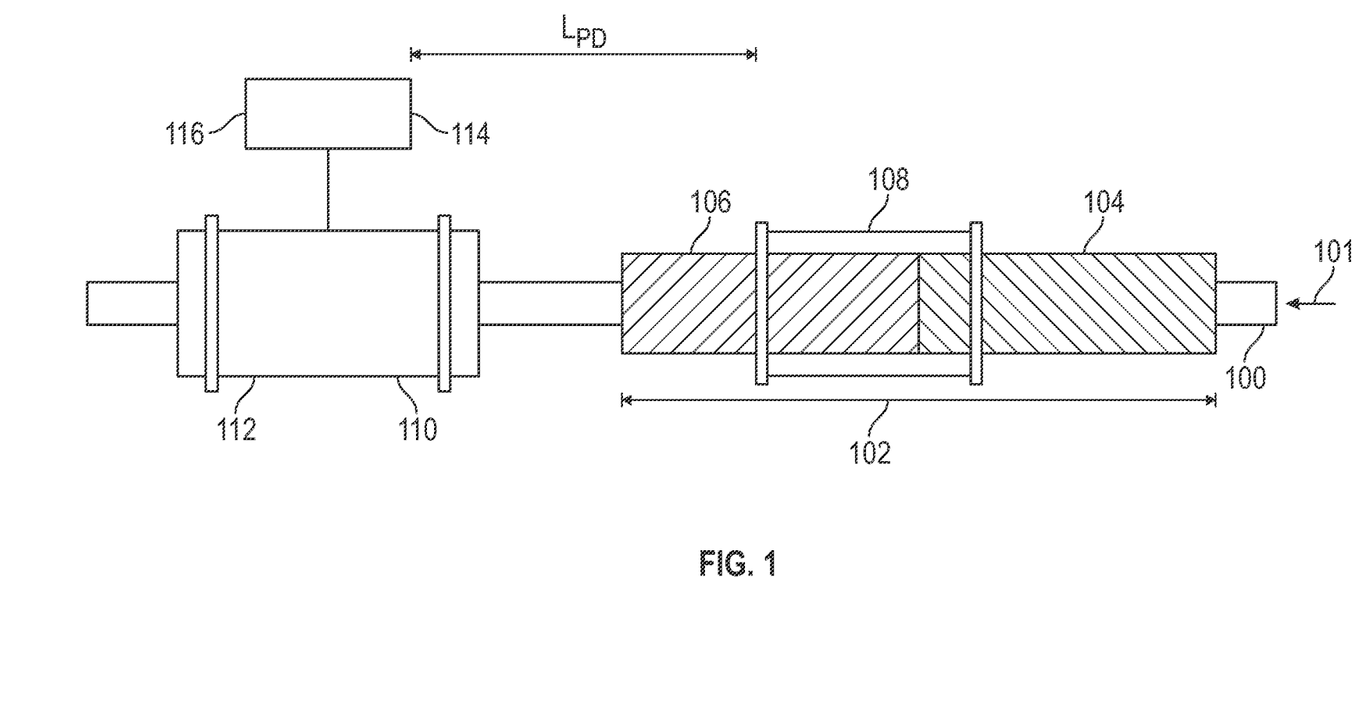
FIG. 1 is a simplified schematic of a measurement system according to embodiments herein.

Turning now to FIG. 1, a schematic depiction of a multiphase flow metering device in accordance with one or more embodiments of the present disclosure is shown. Multiphase fluid flows through a conduit 100. The direction of fluid flow is indicated by arrow 101. A structured packing zone 102 is provided in the flow path, such as being located within the conduit. The structured packing zone may include a water-wet packing structure zone 104 and/or an oil-wet packing structure zone 106. A Halbach pre-polarizing magnet 108 is positioned around the conduit 100. An RF coil 110 and an electromagnet 112 are positioned around the conduit 100 downstream from the Halbach pre-polarizing magnet 108. An NMR console 114 is adapted to detect and encode NMR signals from the multiphase fluid, and a control system 116 within the NMR console 114 may be used to vary the position and polarization of the Halbach pre-polarizing magnet 108. The $T_1$ of the components of the fluid, along with their residence time in the RF coil 110, are used to quantify the velocity and composition of the multiphase fluid.

As noted above, the structured packing zone 102 may include a water-wet packing structure zone 104 and/or an oil-wet packing structure zone 106. A water-wet packing structure zone 104 may reduce the $T_1$ of water phase in the multiphase fluid. This results in a more rapid polarization of the water phase. Similarly, an oil-wet packing structure zone 106 may reduce the $T_1$ of oil in the multiphase fluid. As such, the water-wet and/or oil-wet packing structure zones assist in enhancing the NMR signal of a phase in the multiphase fluid.

The composition of the structured packing insert may be selected based upon the desired signal enhancement. For example and as explained above, in a multiphase fluid that contains oil, water and gas, the gas component may overwhelm the signal generated from the oil and water phases. Thus, water-wet and oil-wet structured packing inserts may be selected to enhance water and oil phases, respectively, leading to improved NMR detection of the liquid phases. In one embodiment, the structured packing zone 102 is a water-wet packing insert configured to enhance the NMR signal of the water phase. In another embodiment, the structured packing zone 102 is an oil-wet packing insert configured to enhance the NMR signal of the oil phase. In yet another embodiment, the structured packing zone 102 has a water-wet packing structure zone 104 and an oil-wet packing structure zone 106 configured to enhance the NMR signals of both the water phase and the oil phase.

The structured packing insert may be positioned in any suitable portion of the conduit that is upstream from the RF coil. NMR signal enhancement may be maximized when the packing insert is located in close proximity to the RF coil.

The water-wet packing structure material may be made of any suitable material that may enhance the signal from the water phase. For example, the water-wet packing structure may be acid-treated borosilicate glass, soda-lime glass and silica. Surface interactions between water-wet packing structure and the water phase may reduce the local $T_1$ value of the water phase.

The oil-wet packing structure material may be made of any suitable material that may enhance the signal from the oil phase. For example, the oil-wet packing structure may include siloxane-treated borosilicate and soda-lime glass. Surface interactions between oil-wet packing structure and the oil phase may reduce the local $T_1$ value of the oil phase.

Referring back to FIG. 1, in one or more embodiments of the present disclosure, a pre-polarization Halbach magnet array 108 is positioned around the conduit. The pre-polarization Halbach array 108 applies a magnetic field to the multiphase fluid to pre-polarize the fluid prior to optional additional polarization by the electromagnet 112. For example, the pre-polarization Halbach array 108 may apply a magnetic field of 0.3 T (tesla). Any suitable magnetic field may be used, so long as the magnetic field is greater than the magnetic field used for detection in the RF coil. The pre-polarization of multiphase fluids may result in an increased NMR signal for fluids in the multiphase flow.

The Halbach array 108 may be stationary, or it may be movable along the length of the conduit 100. Such movement is controlled by the control system 116. Therefore, a distance between the Halbach array 108 and the RF coil 110, referred to herein as $L_{PD}$, may be variable. Changes in the $L_{PD}$ result in changes in the NMR signal. The $L_{PD}$ may be from 0.4 to 2 m (meters), for example.

In the embodiment shown in FIG. 1, the Halbach array 108 is positioned around a portion of the water-wet 104 and oil-wet 106 packing structures. When a pre-polarization pulse is applied to a fluid concomitantly with the fluid being in contact with a structured packing insert, the resulting NMR signal is increased as compared to only applying a pre-polarization pulse. For example, when the Halbach array 108 is positioned over the oil-wet packing structure zone 106 when applying a pre-polarization pulse, the oil phase is rapidly polarized as its respective $T_1$ is reduced, resulting in the NMR signal from the oil phase being preferentially enhanced. In another embodiment, the Halbach array 108 is positioned over the water-wet packing structure zone 104 when applying a pre-polarization pulse, and the signal from the water phase is preferentially enhanced via a reduction in $T_1$ of the water phase. In yet another embodiment, the Halbach array 108 is positioned over the oil-wet packing structure zone 106 and the water-wet packing structure zone 104 when a pre-polarization pulse is applied, thus, the signals of the oil phase and the water phase are enhanced. Therefore, by moving the position of the Halbach array 108 along the conduit 100, the NMR signal from certain phases may be selectively enhanced.

An electromagnet 112 is positioned downstream from the Halbach array. The electromagnet applies a pulsed magnetic field to the multiphase fluid to generate an additional polarization at the RF coil 110. For example, the electromagnet 112 may apply a magnetic field of 0.1 T. The polarization pulse time of the electromagnet 112 may be varied. A longer polarization pulse time leads to a greater extent of polarization. The polarization pulse time may be any suitable time, so long as the polarization pulse time is less than or equal to the residence time of a fluid inside the portion of the conduit surrounded by the electromagnet 112. For example, the pulse time may not be greater than one second, in some embodiments. The RF coil 110 is used to excite and detect NMR signals from the multiphase fluid.

The NMR console 114, which includes the control system 116, is used to detect and encode the NMR signals in order to obtain composition and velocity of the multiphase fluid. The control system is also used to vary the pre-polarization properties (e.g., the $L_{PD}$ and the pulse time of the electromagnet 112).

Figure 2:
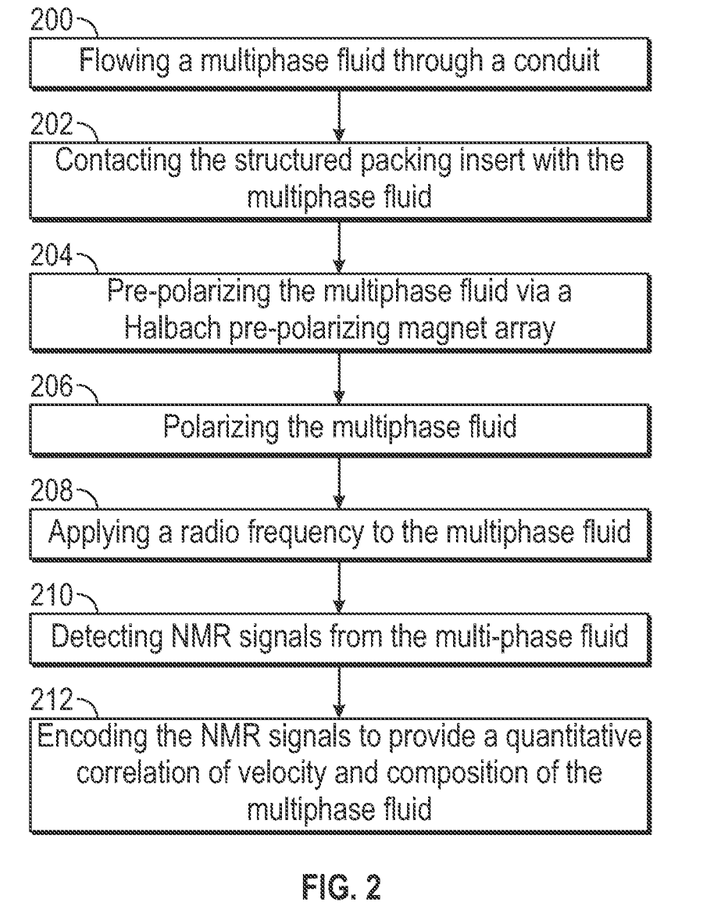
FIG. 2 is a flow diagram of a method of measuring a multiphase fluid according to embodiments herein.

The apparatus described above may be used for quantifying the composition and velocity of multiphase fluids via NMR. An exemplary method is shown in FIG. 2, and includes flowing 200 a multiphase fluid through a conduit. As explained above, the fluid may flow across a structured packing insert, which may include a water-wet packing structure zone and/or an oil-wet packing structure zone. The method then includes contacting 202 the multiphase fluid with the structured packing insert. Next, the fluid is pre-polarized 204 by the Halbach pre-polarizing magnet array, which is positioned around the conduit. The pre-polarizing step may include varying the distance between the Halbach pre-polarizing magnet and the RF coil. The contacting step 202 occurs concomitantly with the pre-polarizing step 204. The multiphase fluid is then additionally polarized 206 by the electromagnet, positioned downstream from the Halbach pre-polarizing magnet array. A radiofrequency is applied 208 via an RF coil. The RF coil excites and detects an NMR signal 210. The NMR signal is then encoded 212 to provide a quantitative correlation of velocity and composition of the multiphase fluid.

The contacting step 202 causes a reduction of the $T_1$ values of the water phase and/or the oil phase, resulting in an increase in the NMR signal of the water phase and/or the oil phase during the pre-polarizing step 204, provided they occur concomitantly. As explained above, the position of the Halbach array 108 in relation to the structured packing insert 102 affects which NMR signals are enhanced. $T_1$ values may be reduced by as much as 80% as a result of this process. The extent of the reduction depends on the velocity of the fluid and the starting $T_1$ value of the fluid.

The encoding step 212 is used to convert the measured NMR signals into quantifiable velocity and composition of the multiphase fluids. As described above, the position of the Halbach array and/or the polarization time of the electromagnet may be varied. Thus, these two values may serve as independent variables for further data analysis. In one embodiment of the present disclosure, an NMR signal from the multiphase fluid is detected at different $L_{PD}$ values. These values are then plotted as a 2-dimensional data set (e.g., $L_{PD}$ vs. NMR signal decay following excitation). The data is then modeled as a function of the $T_1$ relaxation parameter and velocity. The modeled data is then inverted to produce a 2D correlation plot to give velocity and $T_1$ of the multiphase fluid.

Figure 3:
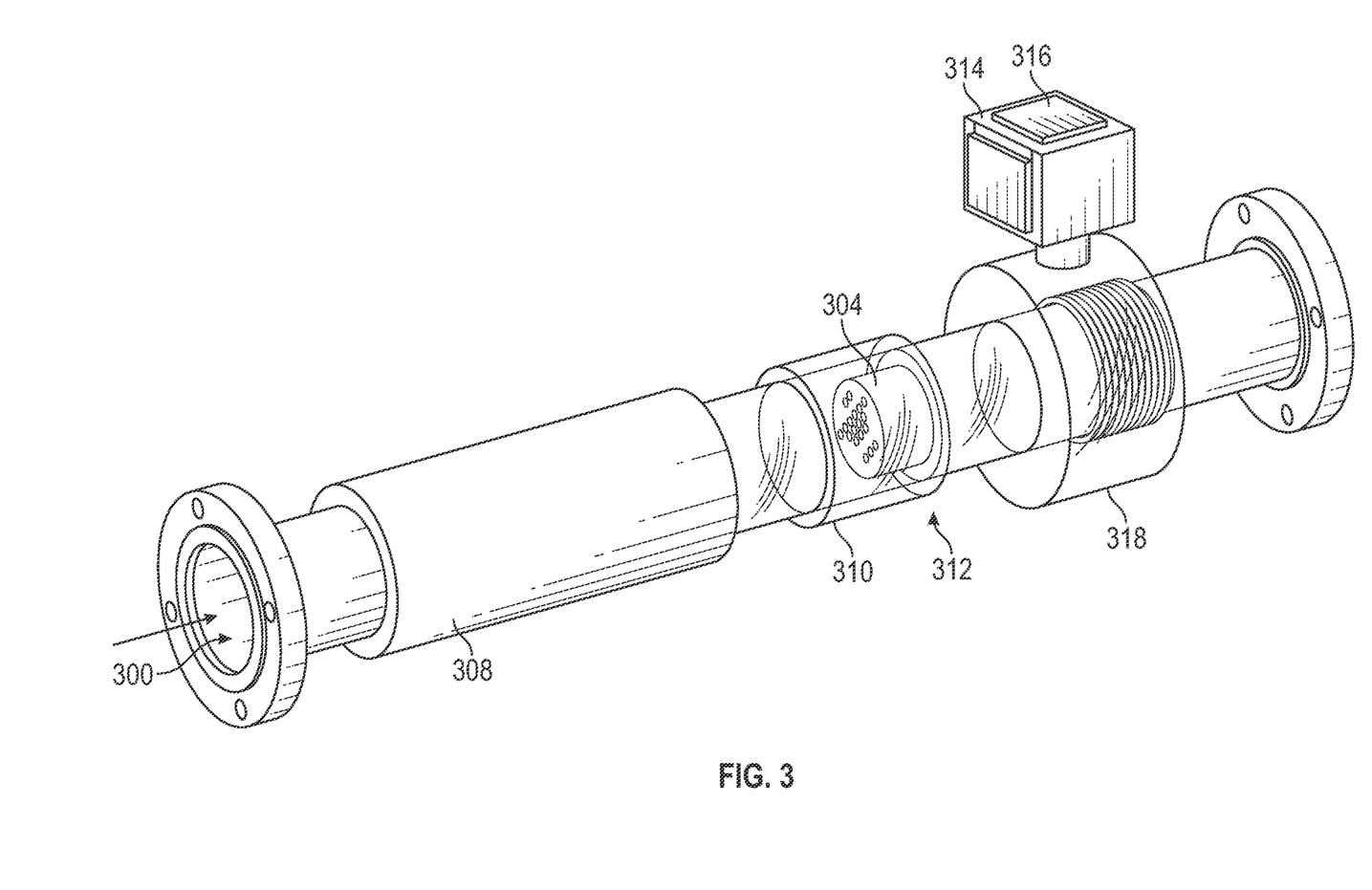
FIG. 3 is a simplified schematic of a measurement system according to embodiments herein.

Turning now to FIG. 3, another embodiment of the present disclosure is shown. Multiphase fluid flows through a conduit 300. The direction of fluid flow is indicated by an arrow. A Halbach pre-polarizing magnet 308 is positioned around the conduit 300. In the embodiment shown in FIG. 3, a structured packing insert having contact surfaces functionalized with immobilized radicals 304 may be provided. The immobilized radicals 304 may be used alone or in addition to a water-wet packing structure zone and/or an oil-wet packing structure zone. In such embodiments, the structured packing insert with immobilized radicals 304 is positioned downstream from the Halbach magnetic array 308. A first RF coil 310 and an electromagnet 312 are positioned around the conduit 300 and around the structured packing insert with immobilized radicals 304. In some embodiments, the first RF coil 310 may be a microwave cavity if stronger magnetic fields are desired. A second RF coil 318 is located downstream from the first RF coil 310. In some embodiments, an optional electromagnet (not shown) may be positioned over the second RF coil 318. If present, the optional electromagnet positioned over the second RF coil can be used to further polarize the signal, and provide greater phase differentiation based on the $T_1$ values (relaxation properties) of the different phases. An NMR console 314 is adapted to detect and encode NMR signals from the multiphase fluid, and a control system 316 within the NMR console 314 may be used to vary the position of the Halbach pre-polarizing magnet 308.

The immobilized radicals used in an embodiment as shown in FIG. 3 may include TEMPO (2,2,6,6-Tetramethylpiperidin-1-yl)oxyl radicals. For example, the immobilized radicals may be nitroxide radicals of TEMPO. As a multiphase fluid passes through the structured packing insert with immobilized radicals, dynamic nuclear polarization (DNP) occurs, preferentially affecting the NMR signal of the wetting fluid. DNP is a process by which high spin polarization of unpaired electrons is transferred to $^1H$ nuclei, resulting in a significant increase in the relevant NMR signal. DNP can result in increasing the NMR signal from the wetting fluid by an order of magnitude. Thus, when used in conjunction with the methods described above (e.g., pre-polarization via a Halbach array and the use of oil-wet and or water-wet packing inserts) significant enhancements in the NMR signal of the wetting fluid can be achieved.

As noted above, a first RF coil 310 and a second RF coil 318 may be used in conjunction with immobilized radicals 304. This is because the first RF coil 310 may be used to excite the fluid at an energy corresponding to the energy of the dynamic nuclear polarization, and the electromagnet applies a magnetic field to polarize the sample. The polarization pulse time of the electromagnet 312 may be varied. A longer polarization pulse time leads to a greater extent of polarization. The polarization pulse time may be any suitable time, so long as the polarization pulse time is equal to or less than the residence time of a fluid inside the portion of the conduit surrounded by the electromagnet 312. For example, the pulse time may not be greater than one second, in some embodiments. The second RF coil 318 may then detect the NMR signal from the fluid. The NMR console is used to detect and encode the NMR signals to obtain composition and velocity of the multiphase fluid.

Figure 4:
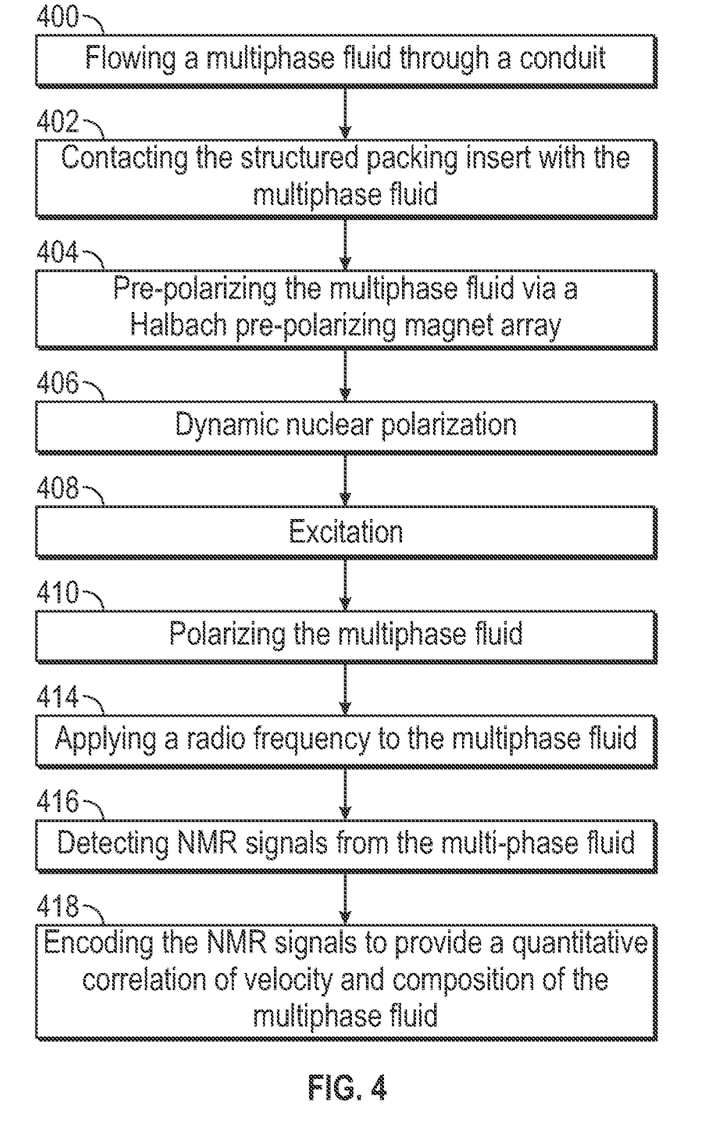
FIG. 4 is a flow diagram of a method of measuring a multiphase fluid according to embodiments herein.

The apparatus described above may be used for quantifying the composition and velocity of multiphase fluids via NMR. As outlined above, the conduit may have a structured packing insert, which may include a water-wet packing structure zone and/or an oil-wet packing structure zone. The conduit may also or alternatively have a structured packing insert containing surfaces with immobilized radicals. An exemplary method is shown in FIG. 4, and includes flowing 400 a multiphase fluid through a conduit. The method then includes contacting 402 the multiphase fluid with the water-wet and/or oil-wet structured packing insert, if present. Next, the fluid is pre-polarized 404 by the Halbach pre-polarizing magnet array, which is positioned around the conduit. The contacting step 402 occurs concomitantly with the pre-polarizing step 404. The fluid then undergoes dynamic nuclear polarization 406 as it contacts the structured packing insert containing surfaces with immobilized radicals. The fluid is excited 408 by the RF coil at an energy corresponding to the dynamic nuclear polarization. The multiphase fluid is then polarized 410 by the electromagnet, positioned downstream from the Halbach pre-polarizing magnet array. A radiofrequency is applied 414 via the second RF coil. The second RF coil detects the NMR signal 416. The NMR signal is then encoded 418 to provide a quantitative correlation of velocity and composition of the multiphase fluid.

Advantageously, then, in select embodiments, the $T_1$ of the oil phase is manipulated to arrive at better contrast with water (and hence better phase composition), and the signal from one of the phases in a multiphase flow system is boosted, resulting in improved differentiation of the signal from different phases.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function

The invention claimed is:

1. A multiphase flow metering device comprising:
  a conduit through which a multiphase fluid can flow;
  a structured packing insert positioned in the conduit, the structured packing insert comprising at least one of a water-wet packing structure zone and an oil-wet packing structure zone;
  a Halbach pre-polarizing magnet array positioned around the conduit;
  an RF coil;
  an electromagnet;
  an NMR console adapted to detect NMR signals from the multiphase fluid; and
  a control system configured to vary a position of the Halbach pre-polarizing magnet array,
  wherein the Halbach pre-polarizing magnet array is positioned or positionable over one or both of the oil-wet and water-wet packing structure zones.

2. The multiphase flow metering device of claim 1, wherein the multiphase fluid comprises two or more of an oil phase, a water phase, and a gas phase.

3. The multiphase flow metering device of claim 1, wherein the water wet packing structure comprises acid-treated borosilicate glass.

4. The multiphase flow metering device of claim 1, wherein the oil wet packing structure comprises siloxane.

5. The multiphase flow metering device of claim 1, comprising a distance between the Halbach pre-polarizing magnet and the RF coil, wherein the distance is from 0.4 to 2 meters.

6. The multiphase flow metering device of claim 1, wherein the Halbach pre-polarizing array is configured to move along the conduit such that a distance between the Halbach pre-polarizing array and the RF coil is variable.

7. The multiphase flow metering device of claim 1, wherein the Halbach pre-polarizing array is positioned at least partially around the water wet packing structure zone.

8. The multiphase flow metering device of claim 1, wherein the Halbach pre-polarizing array is positioned at least partially around the oil wet packing structure zone.

9. The multiphase flow metering device of claim 1, wherein the Halbach pre-polarizing array is positioned at least partially around the water wet packing structure zone and at least partially around the oil wet packing structure zone.

10. A multiphase flow metering device comprising:
  a conduit through which a multiphase fluid can flow;
  a Halbach pre-polarizing magnet array positioned around the conduit;
  a structured packing insert positioned in the conduit, the structured packing insert comprising at least one of a water-wet packing structure zone and an oil-wet packing structure zone, the packing insert having a surface comprising immobilized radicals;
  a first RF coil positioned around the structured packing insert;
  a second RF coil;
  an electromagnet;
  an NMR console adapted to detect NMR signals from the multiphase fluid; and
  a control system configured to vary a position of the Halbach pre-polarizing magnet array.

11. The multiphase flow metering device of claim 10, wherein the immobilized radicals are 2,2,6,6-Tetramethylpiperidin-1-yl)oxyl (TEMPO) nitroxide radicals.

12. The multiphase flow metering device of claim 10, further comprising a second electromagnet positioned around the second RF coil.

13. A method of measuring multiphase flow comprising:
  flowing a multiphase fluid through a conduit, wherein the conduit comprises a structured packing insert, the structured packing insert comprising a water-wet packing structure zone and an oil-wet packing structure zone;
  contacting the structured packing insert with the multiphase fluid;
  pre-polarizing the multiphase fluid via a Halbach pre-polarizing magnet array positioned around the conduit, wherein the Halbach pre-polarizing magnet array is positioned or positionable over one or both of the oil-wet and water-wet packing structure zones;
  polarizing the multiphase fluid via an electromagnet positioned around the conduit and downstream from the structured packing insert;

applying a radio frequency to the multiphase fluid via an RF coil; and detecting NMR signals from the multiphase fluid via an NMR console.

14. The method of claim 13, wherein the pre-polarizing step comprises varying a distance between the Halbach pre-polarizing magnet and the RF coil.

15. The method of claim 14, wherein the distance is from 0.4 to 2 meters.

16. The method of claim 13, further comprising varying a position of the Halbach pre-polarizing magnet with respect to the structured packing insert.

17. A method of measuring multiphase flow comprising:
flowing a multiphase fluid through a conduit, wherein the conduit comprises a structured packing insert positioned in the conduit, the structured packing insert comprising at least one of a water-wet packing structure zone and an oil-wet packing structure zone, the packing insert having a surface comprising immobilized radicals;

contacting the structured packing insert with the multiphase fluid;

pre-polarizing the multiphase fluid via a Halbach pre-polarizing magnet array positioned around the conduit, wherein the Halbach pre-polarizing magnet array is positioned or positionable over one or both of the oil-wet and water-wet packing structure zones;

concomitant with the contacting, generating dynamic nuclear polarization in the multiphase fluid via the immobilized radicals;

exciting the multiphase fluid via a radiofrequency of a first RF coil, the first RF coil positioned around the structured packing insert, and the radiofrequency corresponding to an energy of the dynamic nuclear polarization;

polarizing the multiphase fluid via an electromagnet;

applying a second radiofrequency via a second RF coil; and detecting NMR signals from the multiphase fluid via an NMR console.

18. The method of claim 17, wherein the pre-polarizing step comprises varying a distance between the Halbach pre-polarizing magnet and the first RF coil.

19. The method of claim 18, wherein the distance is from 0.4 to 2 meters.

20. The method of claim 17, further comprising varying a position of the Halbach pre-polarizing magnet with respect to the structured packing insert.

* * * * *